July 12, 1960 B. C. HALL, JR 2,944,750

TAPE RECORDER INDICATOR ATTACHMENT

Filed March 8, 1957 2 Sheets-Sheet 1

INVENTOR.
BUFORD C. HALL, JR.
BY
McMorrow, Berman & Davidson
ATTORNEYS

TAPE RECORDER INDICATOR ATTACHMENT

Filed March 8, 1957 2 Sheets-Sheet 2

INVENTOR.
BUFORD C. HALL, JR.
BY
McMorrow, Berman + Davidson
ATTORNEYS

United States Patent Office 2,944,750

Patented July 12, 1960

2,944,750

TAPE RECORDER INDICATOR ATTACHMENT

Buford C. Hall, Jr., 1946 Walnut Ave., Yuma, Ariz.

Filed Mar. 8, 1957, Ser. No. 644,901

2 Claims. (Cl. 242—55.12)

The present invention relates to an attachment for a tape recorder and specifically to an attachment for indicating specific sections of the windings of the tape.

An object of the present invention is to provide a tape recorder indicator attachment which lends itself to accurately indicating a particular section of a recorded tape so that recorded music or other impression may be quickly and easily advanced into position for playback without the necessity of playback of the whole tape.

Another object of the present invention is to provide a tape recorder indicator attachment which is easily shifted from one reel of the recorder to the other reel when it is desired to reverse the reels in their positions for playback in the opposite direction.

A further object of the present invention is to provide a tape recorder indicator attachment which is easily and quickly mounted upon the recorder and as easily and quickly detached from the recorder for storage.

These and other objects and advantages of the present invention will be fully apparent from the following description when taken in connection with the annexed drawings, in which.

Figure 1:
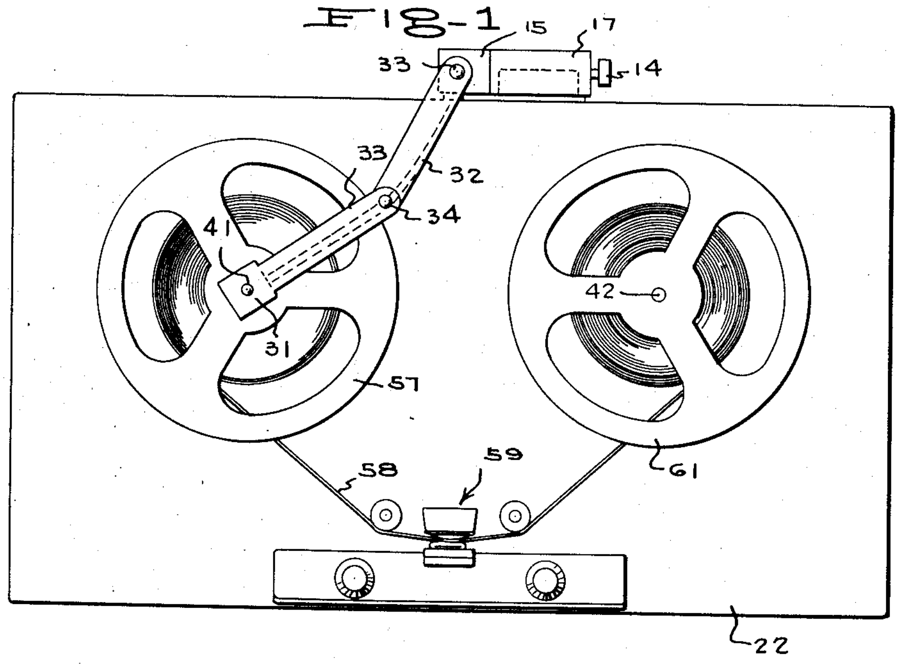
Figure 1 is a plan view of a tape recorder showing the attachment according to the present invention installed thereon.

Referring in greater detail to the drawings in which like numerals indicate like parts throughout the several views, the tape recorder indicator attachment according to the present invention comprises a revolution counter designated generally by the reference numeral 10 and of conventional construction, the counter 10 including a transparent front window 11, a plurality of rotatable numeral wheels 12 arranged in side by side abutting relation within the counter 10 and mounted upon a shaft 13 which has one end exteriorly of the counter casing and carrying a reset knob 14 and has the other end extending into a housing 15 and carrying a first bevel gear 16. The housing 15 is formed integrally with or attached by conventional means to an auxiliary housing 17 enclosing and supporting the counter 10.

Figure 2:
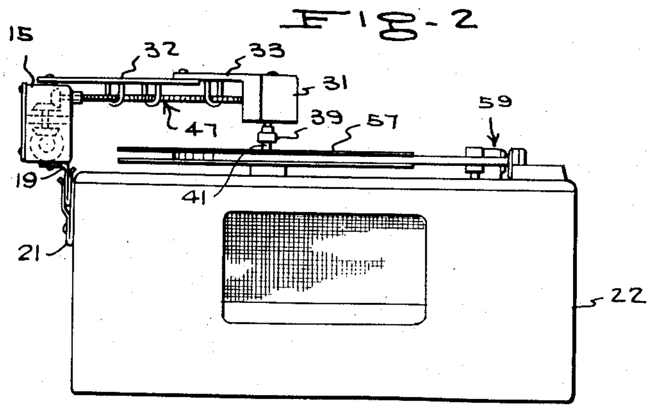
Figure 2 is an end view of the assembly shown in Figure 1.
Figures 3, 4:
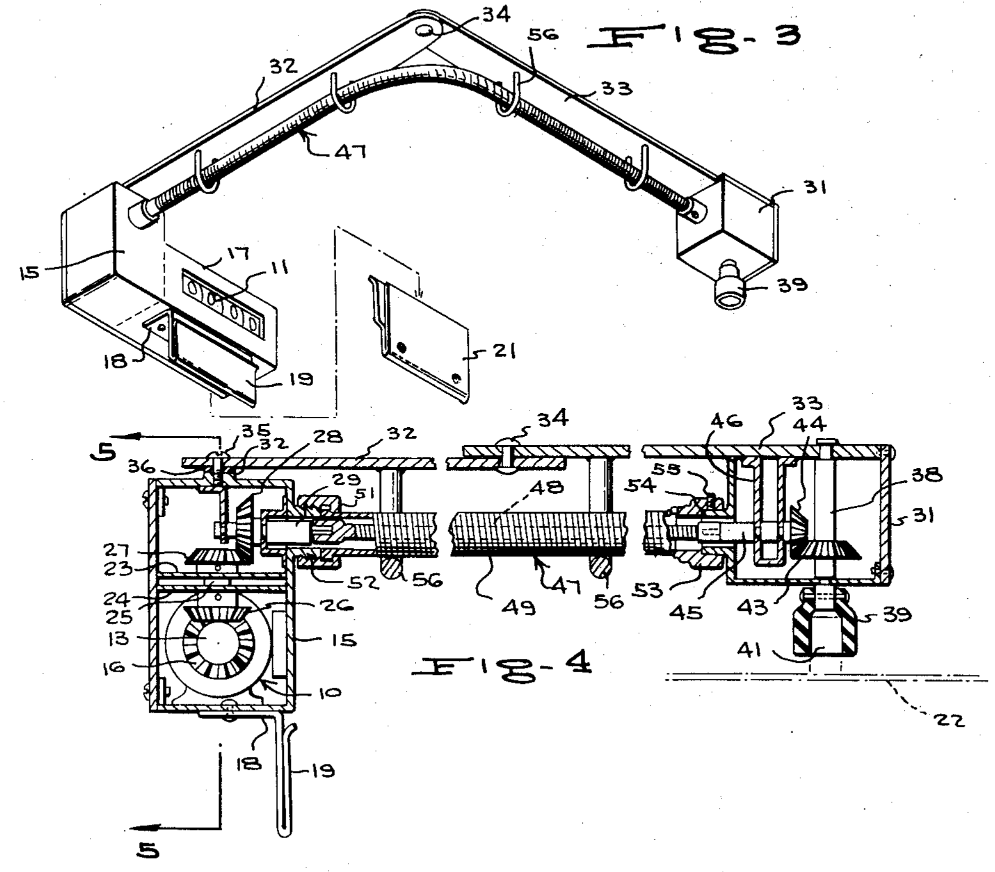
Figure 3 is a perspective view of the attachment of the present invention, as seen from the underside, the portion of the attachment by means of which it is secured to the recorder being shown in the exploded view.
Figure 4 is a sectional view, on an enlarged scale, of the assembly of Figure 3.
Figure 5:
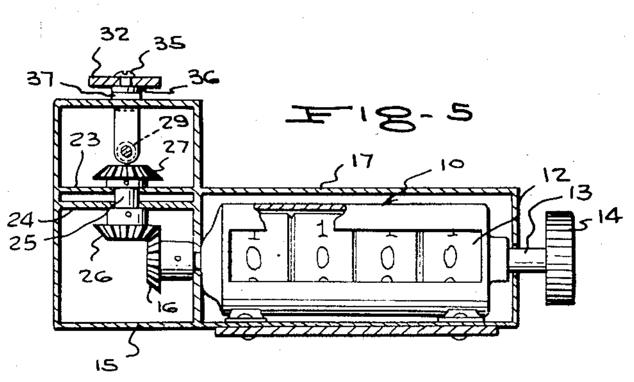
Figure 5 is a fragmentary sectional view taken on the line 5—5 of Figure 4.

An L-shaped bracket 18 is fixedly secured to the underside of the auxiliary housing 17 and is positioned longitudinally thereof and has an upwardly extending leaf spring member 19 secured by its lower end to the free end of the long leg of the bracket 18. A support bracket 21 is provided by the present invention and is of substantially U-shape in cross-section with the bight thereof closed and forming a slot for receiving the long leg of the bracket 18 and the leaf member 19 for support of the housing 15 and the auxiliary housing 17 upon the side wall of a recorder 22, as shown in Figures 1 and 2.

A pair of horizontally disposed partitions arranged in parallel spaced relation and designated by the reference numerals 23 and 24 extend across the housing 15 intermediate the upper and lower ends thereof and form supports for a vertically disposed shaft 25 having a second bevel gear 26 on its lower end and a third bevel gear 27 on its upper end. The bevel gear 26 is in meshing engagement with the bevel gear 16 and a fourth bevel gear 28, mounted upon a stub shaft 29, is in meshing engagement with the bevel gear 27. The stub shaft 29 projects perpendicularly with respect to the revolution counter shaft 13 and from the upper end of the housing 15 above and spaced from the shaft 13, and constitutes one end of a gear train rotatably mounted within the housing 15, the other end of the gear train being operatively connected to the revolution counter shaft 13. It is to be noted that the shaft 25, bevel gears 26 and 27, and shaft 29 carrying bevel gear 28 comprise a first gear train driven unit.

A second housing 31 is arranged in spaced relation with respect to the housing 15 and means embodying a pair of horizontally disposed bars 32 and 33 arranged in end to end abutting relation connects the housing 15 to the housing 31 for movement toward and away from each other. A pivot pin 34 connects the abutting ends of the bars 32 and 33 together for swinging movement about the pivot pin 34 as an axis. The other end of the bar 32 is pivotally connected by means of a pivot pin 35 to the upper end of the housing 15. The end of the bar 33 remote from the pivot pin 34 is fixedly secured and formed integrally with the upper end of the housing 31, the adjacent portion of the bar 33 serving to close the open upper end of the housing 31. Preferably, the pivot pin 35 connecting the one end of the bar 32 to the housing 15 is in the form of a securing screw held in position in a hole provided in the bar 32 by means of a securing washer 36, the free end of such screw being threadedly received in a nut 37 soldered, brazed, or welded to the upper surface of the housing 15. Other means may be substituted for the pivot pin 35 for detachably securing the bar 32 to the housing 15, as desired.

Within the housing 31 is journaled a vertically disposed shaft 38 having a portion adjacent its lower end projecting below the housing 31 and carrying a rubber socket member 39 thereon. The socket member 39 is resilient and is of a size to snugly receive the upper end portion of either one of a pair of shafts 41 or 42 rotatably mounted in the recorder 22 and projecting above the upper face of the recorder 22. A bevel gear 43 is secured to the shaft 38 intermediate the ends thereof and is in mesh with another bevel gear 44 carried on a second stub shaft 45. The stub shaft 45 is horizontally disposed and journaled intermediate its ends in a U-shaped support 46 dependingly carried by the portion of the bar 33 which extends over and closes the upper end of the housing 31. It is to be noted that the shaft 45 carrying the bevel gear 44 and the shaft 38 carrying the bevel gear 43 comprise a second gear train driven unit.

A flexible drive shaft, designated generally by the reference numeral 47, extends between the housings 15 and 31 and has one end of its rotatable core 48 operatively connected to the stub shaft 29 and the other end of the core 48 operatively connected to the other stub shaft 45. The external sheath 49 of the flexible drive shaft 47 carries a knurled nut 51 on the end adjacent the stub shaft 29 and threadedly engaged with the threaded boss 52 projecting from the adjacent wall of the housing 15. The other end of the sheath 49 is provided with an enlarged portion 53 circumposed about a sleeve 54 projecting from the one wall of the housing 31 and is secured thereto by means of a conventional set screw 55.

A plurality of U-shaped loops 56 depend from the underside of each of the bars 32 and 33 and embracingly and loosely support the flexible drive shaft 47.

In use, a reel 57 is carried upon the reel shaft 41 above the top of the recorder and has a tape 58 wound around. The tape 58 carries an impression of a recorded piece of music or other sound. The term tape is also intended to include a magnetically impressed wire and all other forms of strands which may be electrically or physically impressed with signal material. A portion of the tape 58 extends between the opposing portions of a recording and playback head, designated generally by the reference numeral 59, and an end portion of the tape 58 is wound about another reel 61 carried by the projecting end of the reel shaft 42.

It will be noted that the atttachment of the socket member 39 to the reel shaft 41 results in the counting of the revolutions of the shaft 41 as the tape 58 is unwound from the reel 57 and wound on the reel 61 with the number of revolutions or portions of revolutions (according to the model or design of the recorder being used) of the shaft 41 as the tape 58 is unwound from the reel 57 and wound onto the reel 61, with the number of revolutions of the shaft 41 recorded by the wheels 12 in the counter 10. The counter does not measure footage of the tape 58.

As each piece of music or other signal is recorded, a note is made of the reading of the counter at the beginning of such a piece. It has been found that the gear 44 may have twenty teeth and the gear 43 may have twenty-four teeth, thus establishing a ratio of counter unit indications to reel rotations; with a particular model of recorder, the reel 57 will turn approximately one thousand times while the counter will indicate approximately twelve hundred units in this example-model indicating approximate footage. It is intended that different models of this invention may change the gear ratio to measure larger or smaller average units of tape or portions of revolutions of the reel.

When it is desired to play back a particular section of the tape 58, it is only necessary to wind or rewind the tape 58 to the previously observed and noted reading of the counter 10, which will position the tape 58 at substantially the point where the recorded piece of music or other signal starts on the tape.

Two examples of the use of this tape recorder attachment will suffice to indicate its use in said examples as well as other implied uses in similar arrangements. Assuming that the tape recorder attachment used has an indication up to 999 and that the tape recorder used is a common one which, to play back the second track of the tape, the operator must run the first sound track side completely through, take off the reel, turn it over, and place it on the other reel shaft, and then connect the free end of the tape to the reel on the side from which it has just been taken. Assuming that a particular recording just made on side 1 and at its beginning the counter indicated 300, the counter being zeroed by its zeroing knob at the beginning of the reel side 1, if it is desired to replay the particular recording, it is but necessary to rapidly run the tape through the recorder to the other reel until the tape recorder indicator attachment indicates that three hundred units have been unwound. The tape is now in position for playback of the particular recording.

The second example illustrates the tape recorder attachment attached to a tape recorder which does not require that the reels be removed from the left side, turned over and placed on the other side for the purpose of playing the second sound track. This type of tape recorder changes sound tracks by use of gears or buttons in a system in which the reels simply reverse direction of rotation to playback the other sound track. Assuming that the counter indication units to tape reel shaft revolutions is 1,200/1,000 which should give us in this case indications of an average footage; since the 1,000 reel turns reels in approximately 1,200 feet of tape. The length of tape wound onto the reel is constantly changing per counter indication but the counter indication determines with desired accuracy the particular positioning of the recorded portion of the tape. After the counter has been turned to zero, several recordings are made on the sound track number 1 on the tape. Each recording is noted at its beginning as the counter indicates. Assuming that a signal began at a place indicated as 400 on the counter on sound track 1 and was terminated at 900 and the operator reversed the directions of the reels and began the recording at 900 in the opposite direction on the second sound track and terminated at 500, the counter reversing its direction of computation with the reels, it is only necessary to move the tape on rapid wind until the counter indicates 400 again and then reengage the recorder to play sound track number one.

In either example, above illustrated, the operator has but to read off the numbers indicated on the counter and then to reel the recorder to the number on the sound track side he wishes to play. Irrespective of the ratio of the indicator units to number of revolutions of the reel shaft, the same principle is used to find the desired recorded material on the tape by a direct reading of the counter.

The means for visually recording and indicating the respective windings of the reels of the sound recorder, according to the present invention, will be seen to be useful commercially as well as non-commercially, and will assist the operator of such a recorder to quickly and accurately reposition the tape or other sound recording strand to a position at which it is desired to commence replaying of a particular recorded piece of music or other signal. This invention can be attached or mounted easily on most models of tape recorders. The attachment of the bracket 18 to the support bracket 21 may be quickly and easily accomplished, and the housings 15 and 31 may be easily separated by the unscrewing of the screw or pivot pin 35 and unscrewing the nut 51, permitting the ready storage of the various components of the present invention in a place apart from the recorder 22.

What is claimed is:

1. In a recorder including a pair of rotatable reel shafts, a reel carried by each shaft, a tape carrying an impression wound upon one of said reels and having a portion adjacent one end wound upon the other of said reels, and means for unwinding the wound tape on said one reel and winding the unwound tape on said other reel, the improvement consisting of providing a means for visually recording and indicating the respective windings unwound from said one reel, said last-named means comprising a revolution counter detachably mounted on said recorder, said counter including a horizontally disposed rotatable shaft having a portion adjacent one end projecting from one end of said counter, an upstanding housing positioned adjacent said one end of said counter and fixedly secured thereto, a gear train rotatably mounted within said housing and having one end operatively connected to said counter shaft portion and having the portion adjacent the other end arranged perpendicularly with respect to and above said counter shaft and projecting from said housing, a second housing arranged in spaced relation with respect to said first-named housing, means connecting said first-named and second housings together for movement toward and away from each other, a gear train rotatably mounted within said second housing and having one end exteriorly of said second housing and drivably connected to one of said reel shafts and having the portion adjacent the other end arranged perpendicularly with respect to and above said second housing gear train one end and projecting from said second housing, and a flexible shaft dependingly carried by said last-named means and having one end thereof operatively connected to said another end of said first-named housing gear train and having the other end thereof operatively connected to said second housing gear train other end.

2. In a recorder including a pair of rotatable reel shafts, a reel carried by each shaft, a tape carrying an impression wound upon one of said reels and having a portion adjacent one end wound upon the other of said reels, and means for unwinding the wound tape on said one reel and winding the unwound tape on said other reel, the improvement consisting of providing a means for visually recording and indicating the respective windings unwound from said one reel, said last-named means comprising a revolution counter detachably mounted on said recorder, said counter including a horizontally disposed rotatable shaft having a portion adjacent one end projecting from one end of said counter, an upstanding housing positioned adjacent said one end of said counter and fixedly secured thereto, a gear train rotatably mounted within said housing and having one end operatively connected to said counter shaft portion and having the portion adjacent the other end arranged perpendicularly with respect to and above said counter shaft and projecting from said housing, a second housing arranged in spaced relation with respect to said first-named housing, means embodying a pair of horizontally disposed bars arranged in end to end abutting relation and connected together at their abutting ends for swinging movement relative to each other about a vertical axis and each bar having the other end thereof secured to the upper end of the adjacent one of said first-named and second housings, a gear train rotatably mounted within said second housing and having one end exteriorly of said second housing and drivably connected to one of said reel shafts and having the portion adjacent the other end arranged perpendicularly with respect to and above said second housing gear train one end and projecting from said second housing, and a flexible shaft dependingly carried by said bars and having one end thereof operatively connected to said another end of said first-named housing gear train and having the other end thereof operatively connected to said second housing gear train other end.

References Cited in the file of this patent

UNITED STATES PATENTS

| | | |
|---|---|---|
| 1,042,890 | Casgrain | Oct. 29, 1912 |
| 1,721,604 | Rapp | July 23, 1929 |
| 2,417,651 | Kuhlik | Mar. 18, 1947 |
| 2,586,567 | Scheele | Feb. 19, 1952 |
| 2,756,279 | Lang | July 24, 1956 |